US006986129B2

(12) United States Patent
Arbouzov et al.

(10) Patent No.: US 6,986,129 B2
(45) Date of Patent: Jan. 10, 2006

(54) SYSTEM AND METHOD FOR JAVA PREPROCESSOR

(75) Inventors: Leonid M. Arbouzov, Campbell, CA (US); Konstantin S. Bobrovsky, Berdsk (RU)

(73) Assignee: Sun Microsystems, Inc., Santa Clara, CA (US)

( * ) Notice: Subject to any disclaimer, the term of this patent is extended or adjusted under 35 U.S.C. 154(b) by 701 days.

(21) Appl. No.: 09/930,541

(22) Filed: Aug. 14, 2001

(65) Prior Publication Data

US 2002/0178438 A1    Nov. 28, 2002

Related U.S. Application Data

(60) Provisional application No. 60/291,670, filed on May 16, 2001.

(51) Int. Cl.
*G06F 9/45*    (2006.01)

(52) U.S. Cl. ........................ 717/146; 717/108
(58) Field of Classification Search ................ 717/148, 717/136
See application file for complete search history.

(56) References Cited

U.S. PATENT DOCUMENTS

| | | | | |
|---|---|---|---|---|
| 6,292,822 B1 * | 9/2001 | Hardwick | .................. | 718/105 |
| 6,298,389 B1 * | 10/2001 | Gerhardt | ..................... | 719/313 |
| 6,442,533 B1 * | 8/2002 | Hinkle | ........................ | 705/35 |
| 6,466,999 B1 * | 10/2002 | Sliger et al. | .................. | 710/68 |
| 6,477,683 B1 * | 11/2002 | Killian et al. | .................. | 716/1 |
| 6,516,461 B1 * | 2/2003 | Ichisugi | ...................... | 717/144 |
| 6,530,080 B2 * | 3/2003 | Fresko et al. | ............... | 717/166 |
| 6,574,790 B1 * | 6/2003 | Abramson et al. | .......... | 717/100 |
| 6,634,022 B1 * | 10/2003 | Leermakers | ................ | 717/158 |
| 6,675,354 B1 * | 1/2004 | Claussen et al. | ............ | 715/513 |

OTHER PUBLICATIONS

"JAVA!", Tim Richey, Chapters 1,2,6,7,13 and 14, Sep. 22, 1995.*
"The Design and Evolution of C++" Bjarne Stroustrup, pp. 423-426, Mar. 9, 1994.*
"The Annotated C++ Reference Manual ANSI Base Document", Margaret Ellis et al, pp. 341-385 and 397-399, Jun. 7, 1990.*
"JAVA Primer Plus", Paul M. Tyma et al, pp. 256-257, Mar. 6, 1996.*
Rational Rose/C++, Rational software Corporation, 1996, pp. 113-186.*

* cited by examiner

*Primary Examiner*—Todd Ingberg
(74) *Attorney, Agent, or Firm*—Martine Penilla & Gencarella, LLP (57) ABSTRACT

A Java preprocessor method is provided. A Java template file is received that includes Java programming language code and meta code. The Java template is then processed to create an intermediate program using the meta code, wherein the intermediate program is a Java program. The intermediate program is compiled to create an intermediate class, which is a Java based class, and an object text file is generated using the intermediate class.

20 Claims, 7 Drawing Sheets

SYSTEM AND METHOD FOR JAVA PREPROCESSOR

CROSS REFERENCE TO RELATED APPLICATIONS

This application claims the benefit of U.S. Provisional Patent Application having Ser. No. 60/291,670, filed on May 16, 2001, entitled "System and Method for Compatibility Testing in a Java Environment," which is hereby incorporated by reference. This application is also related to (1) U.S. patent application Ser. No. 09/881,822, filed Jun. 14, 2001, and entitled "System and Method for Specification Tracking in a Java Compatibility Testing Environment," (2) U.S. patent application Ser. No. 09/906,636, filed Jul. 16, 2001, and entitled "System and Method for a Automated Java Test Generation Library," and (3) U.S. patent application Ser. No. 09/881,791, filed Jun. 14, 2001, and entitled "System and Method for Automated Assertion Acquisition in a Java Compatibility Testing Environment." Each of these related patent applications is incorporated herein by reference.

BACKGROUND OF THE INVENTION

1. Field of the Invention

This invention relates generally to the Java program compiling, and more particularly to systems and methods for a Java Macro preprocessor.

2. Description of the Related Art

Programming languages today are commonly written in plain text and later transformed into a machine readable computer program using a compiler. Often, the plain text program includes code portions that should only be compiled when certain conditions are met. Similarly, plain text programs often include constants that are confusing for program maintenance unless meaningful names are attached to them. To allow developers to handle these situations, many computer programming languages, such as C++, have software, referred to as preprocessors, that performs preliminary processing on the input plain text program file prior to compiling the plain text program.

Figure 1:
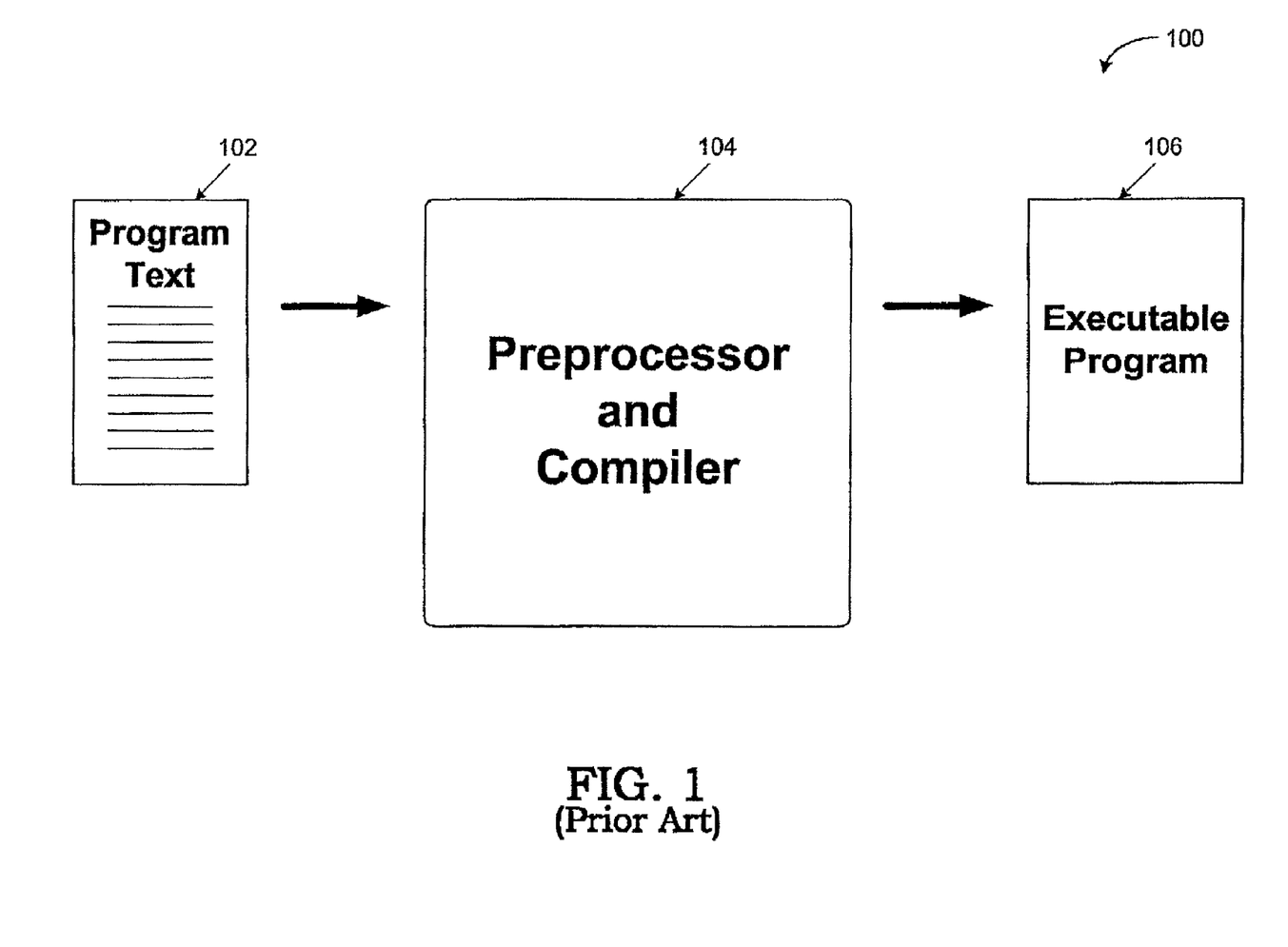
FIG. 1 is a block diagram showing a prior art preprocessor data flow.

FIG. 1 is a block diagram showing a prior art preprocessor data flow 100. The preprocessor data flow 100 shows a program text file 102, a preprocessor and compiler system 104, and a resulting executable program file 106. The program text file 102 generally comprises computer programming code and meta code for use with the Java preprocessor. Meta code is lines of text in a source file which start with a particular symbol, such as the '#' symbol. Such lines are treated as directives by the preprocessor.

In operation, the program text file 102 is provided to the preprocessor and compiler system 104, which preprocesses and compiles the program text file 102. The preprocessor and compiler system 104 then generates the executable program file 106, which can then be executed by a computer. The preprocessor processes the program text file 102 based on the meta code present in the program text file 102.

The meta code provides the directives that the preprocessor uses to alter the program text file 102 in preparation for compiling. The meta code typically includes directives to substitute constants for various strings, and directives for conditional compiling. Conditional compiling often directs the preprocessor to select a first section of code for later compiling if a particular condition is met, or a second section of code if the condition is not met.

Unfortunately, since preprocessor directives were prohibited by the Java language specification, preprocessors are currently unavailable for the Java computer programming language. Java, originally developed by Sun Microsystems, is an object-oriented, multi-threaded, portable, platform-independent, secure programming environment used to develop, test and maintain software programs. Java programs have found extensive use on the World Wide Web, which is the Internet's multimedia information retrieval system. These programs include full-featured interactive, standalone applications, as well as smaller programs, known as applets, that run in a Java-enabled Web browser or applet viewer. Unfortunately, the lack of preprocessing ability in the Java language greatly reduces the power and efficiency available when using the Java programming language.

In view of the foregoing, there is a need for systems and methods that provide preprocessing in a Java environment. The systems should allow meta code to be included in Java plain text program files, and should further provide great flexibility in the directives that can be used with the Java preprocessor.

SUMMARY OF THE INVENTION

Broadly speaking, the present invention fills these needs by providing a Java preprocessor that uses meta code based on the Java programming language. The Java based meta code provides increased flexibility and power generally unavailable when using conventional programming language preprocessors. In one embodiment, a method for preprocessing Java application code is disclosed. The method includes receiving a Java template file, where the Java template file includes Java programming language code and meta code. In some instances, the Java template can include plain text. The Java template is then processed to create an intermediate program using the meta code, wherein the intermediate program is a Java program. The intermediate program is compiled to create an intermediate class, which is a Java based class, and an object text file is generated using the intermediate class. Optionally, the meta code can include Java programming language statements, and in some embodiments is equivalent to the Java programming language.

A method for transforming lines of a Java template for preprocessing is disclosed in a further embodiment of the present invention. A line of text is obtained from a Java template, and a determination is made as to whether the line of text begins with a meta symbol. The meta symbol is a predefined symbol indicating that the line of text is a preprocessor directive. The meta symbol is removed from the line of text when the line of text begins with the meta symbol, or the line of text is transformed into a function argument if the line of text does not begin with the meta symbol. In some embodiments, transforming the line of text into a function argument comprises the operation of enclosing the line of text in quotes. Also, the line of text can be prepended with an internal preprocessor method call and an open bracket, and appended with a closing bracket and a semicolon. Further, macros can be transformed into appropriate instructions when present in the line of text.

In a further embodiment, a Java preprocessor is disclosed. The Java preprocessor includes a meta code converter capable of processing a Java template to create an intermediate program using meta code included in the Java template. In addition, an object text generator is included that compiles the intermediate program to create an intermediate class, which is a Java based class. The object text generator is also capable of generating an object text filed using the intermediate class. Optionally, the Java preprocessor can include a preprocessor library interface module that specifies a contract that can be extended by any Java preprocessor library that is to be supported by the Java preprocessor. Also optionally, an executor module can be included that invokes a main method of the object text generator class.

Advantageously, the embodiments of the present invention use the Java language as the meta language, which makes the embodiments of the present invention as flexible and powerful as Java itself. Moreover, the preprocessor of the embodiments of the present can be quickly learned by users, since the users generally will already be familiar with the Java language.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a Java preprocessor. To this end, the present invention provides a Java preprocessor that uses the Java programming language as meta language, which advantageously, makes the embodiments of the present invention as flexible and powerful as the Java language itself. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

As discussed previously, currently the Java programming language lacks the preprocessor feature, which is present and broadly used in most other powerful programming languages, such as C and C++. The embodiments of the present invention address this problem by providing a Java preprocessor.

Specifically, the embodiments of the present invention provide a Java preprocessor, which is able to convert any text file containing preprocessor meta code, referred to as a "template," to another text file, referred to as an "object text file," based on the instructions represented by the meta code contained in the template. Advantageously, the embodiments of the present invention use the Java language as the meta language, which makes the embodiments of the present invention as flexible and powerful as Java itself. Moreover, the preprocessor of the embodiments of the present can be quickly learned by users, since the users generally will already be familiar with the Java language.

Figure 2:
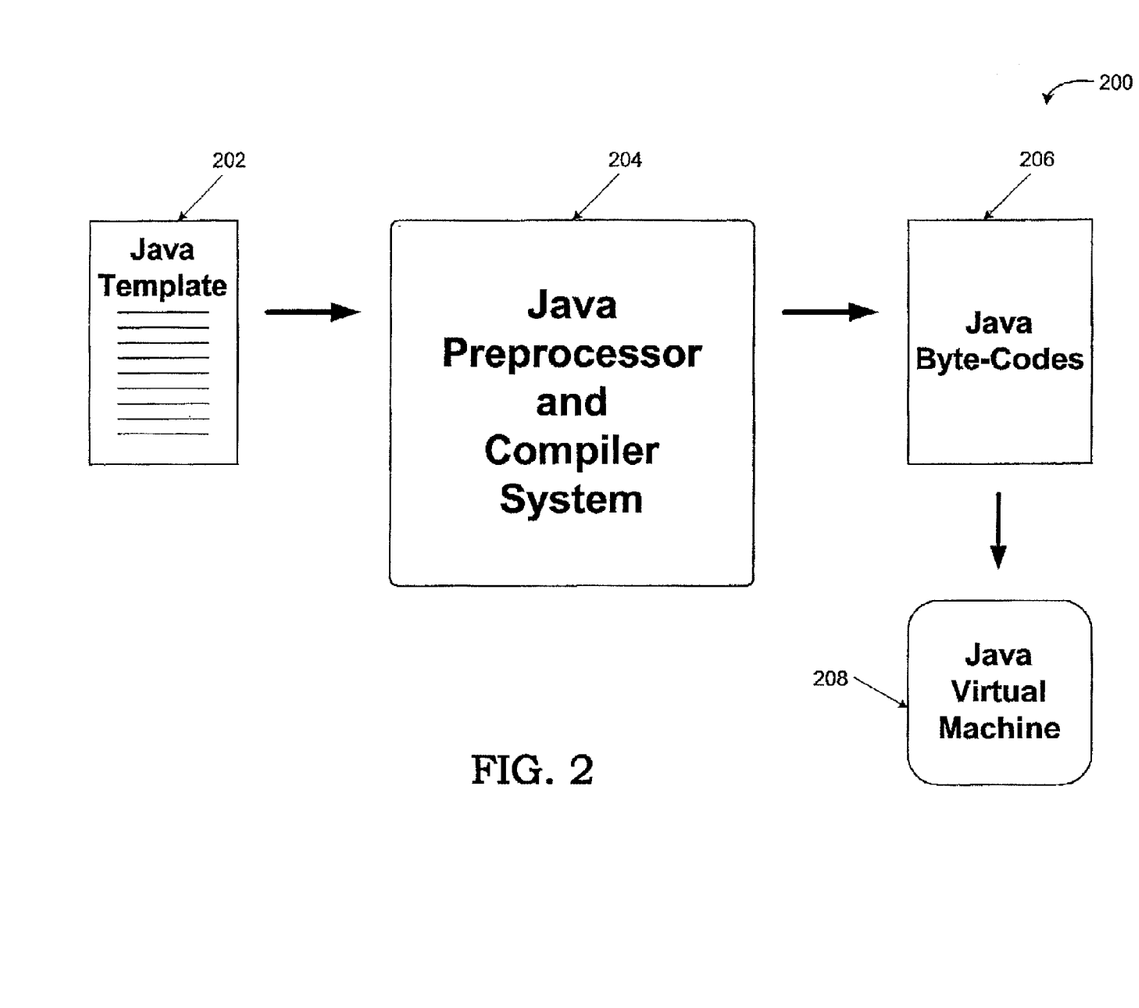
FIG. 2 is a block diagram showing a Java program generation process, in accordance with an embodiment of the present invention.

FIG. 2 is a block diagram showing a Java program generation process 200, in accordance with an embodiment of the present invention. The Java program generation process 200 shows a Java template text file 202, a Java preprocessor and compiler system 204, a Java byte-codes file 206, and a Java virtual machine 208. As mentioned above, the Java template text file 202 comprises a Java language program and meta code for use with the Java preprocessor.

In operation, the Java template text file 202 is provided to the Java preprocessor and compiler system 204, which preprocesses and compiles the Java template text file 202. The Java preprocessor and compiler system 204 generates a Java byte-codes file 206, which can then be executed on any Java enabled platform having a Java virtual machine 208. The Java virtual machine 208 is used as an interpreter to provide portability to Java applications. In general, developers design Java applications as hardware independent software modules, which are executed Java virtual machines. The Java virtual machine layer is developed to operate in conjunction with the native operating system of the particular hardware on which the mobile multimedia framework system is to run. In this manner, Java applications can be ported from one hardware device to another without requiring updating of the application code.

Unlike most programming languages, in which a program is compiled into machine-dependent, executable program code, Java classes are compiled into machine independent byte-code class files 206, which are executed by a machine-dependent virtual machine 208. The Java virtual machine 208 provides a level of abstraction between the machine independence of the byte-code classes and the machine-dependent instruction set of the underlying computer hardware. A class loader is responsible for loading the byte-code class files as needed, and an interpreter or just-in-time compiler provides for the transformation of byte-codes into machine code.

Hence, Java is an interpreted language. The source code of a Java program is compiled into an intermediate language called "bytecode". The bytecode is then converted (interpreted) into machine code at runtime. Thus, Java programs are not dependent on any specific hardware and will run in any computer with the Java Virtual Machine 208 software.

Figure 3:
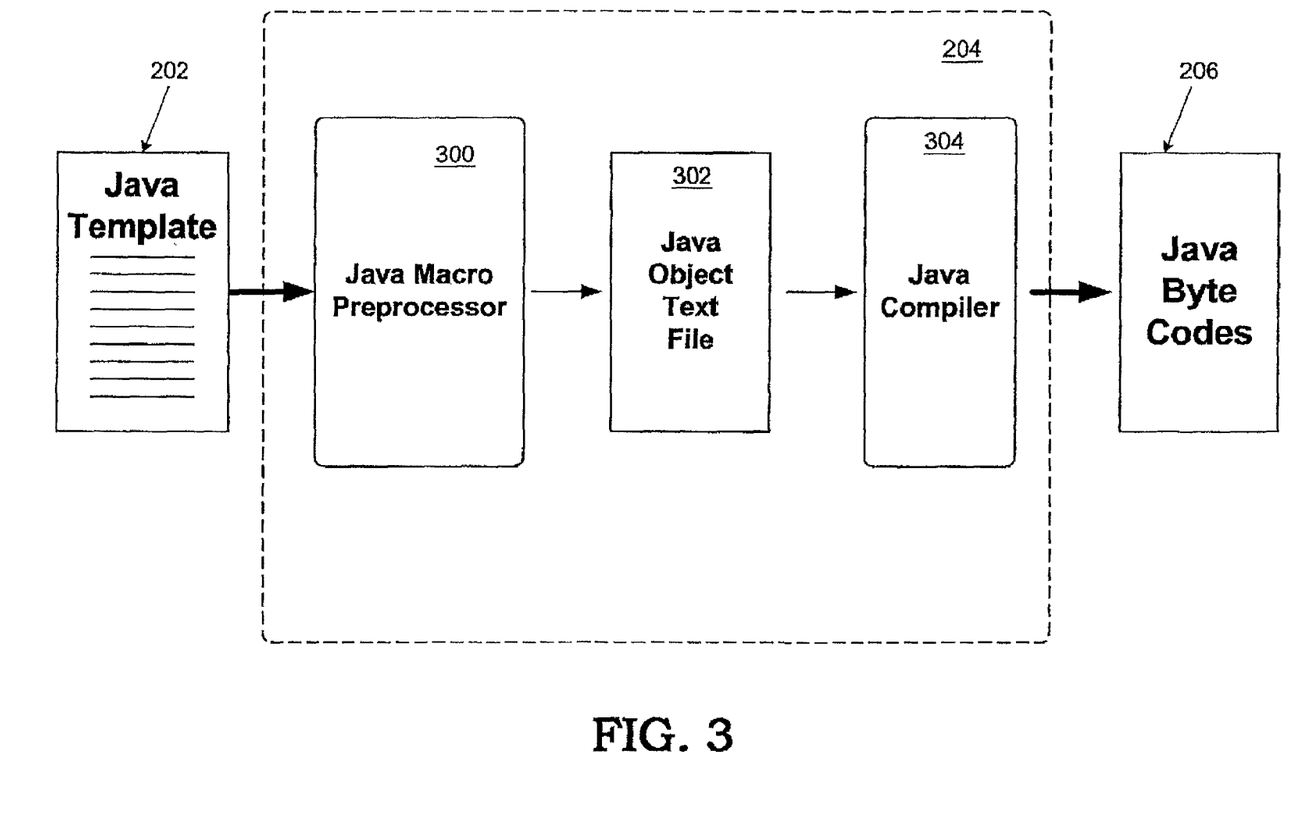
FIG. 3 is a block diagram showing a Java preprocessor and compiler system, in accordance with an embodiment of the present invention.

FIG. 3 is a block diagram showing a Java preprocessor and compiler system 204, in accordance with an embodiment of the present invention. The Java preprocessor and compiler system 204 includes a Java macro preprocessor 300 and a Java compiler 304. The Java macro preprocessor 300 of the embodiments of the present invention allows preprocessing of Java language program text files 202. Similar to preprocessors for other programming languages, the Java macro preprocessor 300 of the embodiments of the present invention allows Java language program text files 202 to be processed prior to compilation. This provides greater flexibility in program development, such as allowing conditional compiling. However, unlike prior art preprocessors, the Java macro preprocessor 300 of the embodiments of the present invention advantageously uses the Java programming language as its meta language.

In use, the Java macro preprocessor 300 receives the Java template 202, which includes Java meta language. The Java macro preprocessor 300 then processes the Java template 202 to produce a Java object text file 302. The Java object text file 302 is essentially a Java program that can be compiled by a Java compiler. For example, if the Java template file 202 included a conditional compiling directive to compile one of two blocks of code depending on a particular condition, then the Java object text file 302 would include one of the blocks of code. In some embodiments, the other block of code would not be placed in the Java object text file 302, while in other embodiments, the block of code could be set off as a comment, which would not be compiled.

The Java object text file 302 is then provided to the Java compiler 304, which compiles the Java object text file 302 to generate a Java byte-codes file 206. As mentioned above, the Java macro preprocessor 300 of the embodiments of the present invention advantageously uses the Java programming language as its meta language. The Java meta language used by the Java macro preprocessor 300 allows the meta language preprocessor directives to be as flexible and powerful as the Java programming language itself.

Figure 4:
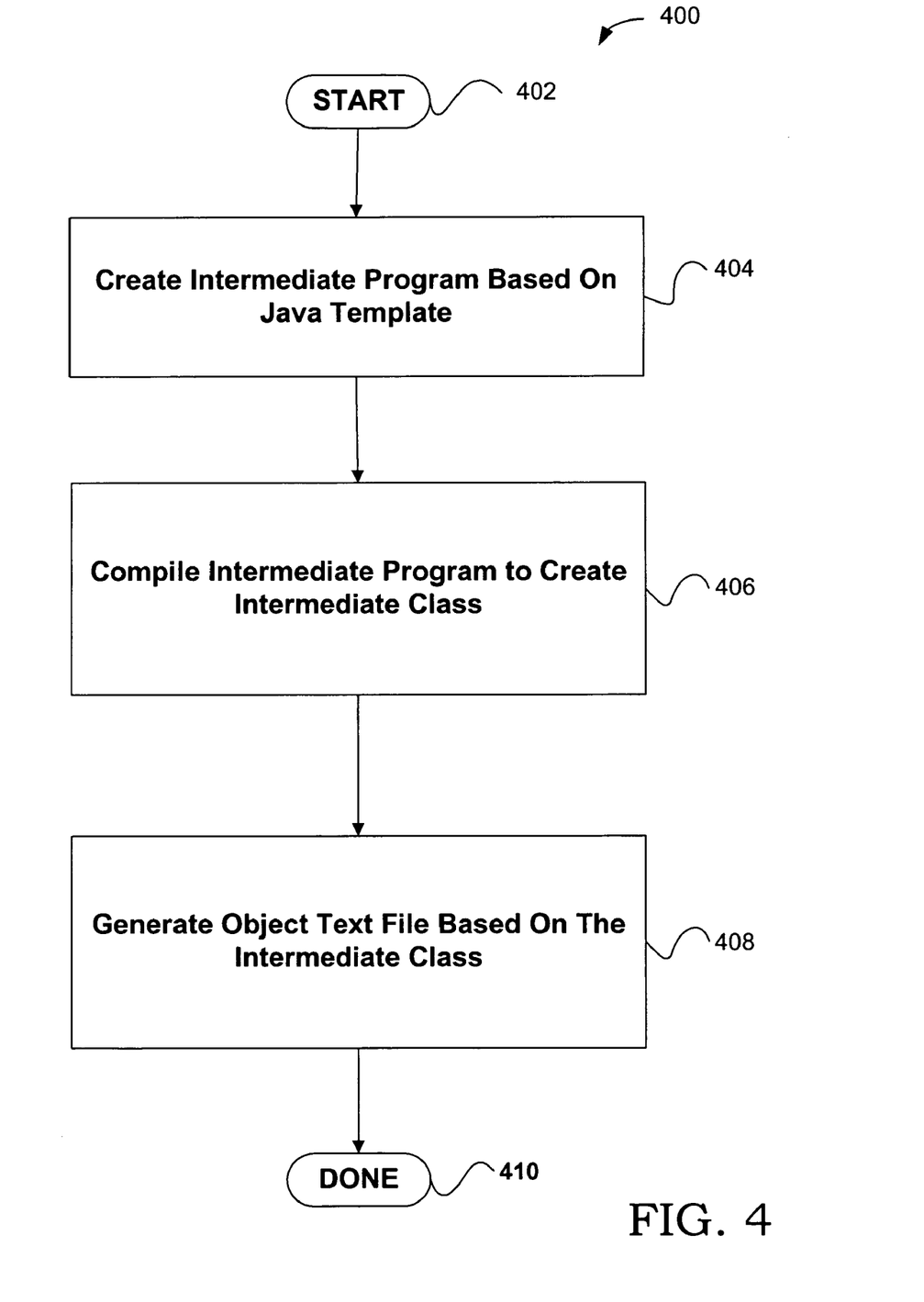
FIG. 4 is a flowchart showing a method for preprocessing a Java template, in accordance with an embodiment of the present invention.

FIG. 4 is a flowchart showing a method 400 for preprocessing a Java template, in accordance with an embodiment of the present invention. In an initial operation 402, initial operations are performed. Initial operations include selecting a Java template to process, and other initial operations that will be apparent to those skilled in the art.

In a preparative operation 404, an intermediate program is created based on the Java template. During the preparative operation 404, the preprocessor reads the Java template, creates header and footer code, transforms each of Java template lines, and writes the header, the transformed lines, preferably in the original order, and the footer to an intermediate program file. The header, referred to as the "prolog", can include some copyright information, Java language 'package' and 'import' clauses, and intermediate program class' declaration with an opening brace '{'. The footer, referred to as the "epilog", can include the definition of the 'main' method and a closing brace '}'.

Next, in operation 406, the intermediate program file is compiled to create an intermediate class. In operation 406, the preprocessor creates an instance of the main javac compiler class, constructs necessary arguments and invokes its 'main' method to compile the intermediate program. If compilation succeeds, the preprocessor remembers the intermediate program class name and proceeds to operation 408. Otherwise, the preprocessor terminates.

A Java object text file is then generated based on the intermediate classes, in operation 408. The preprocessor loads the remembered intermediate program class name and invokes its 'main' method, which actually starts generation of the object text file. Post-process operations are performed in operation 410. Post process operations might include compiling the Java object text file to generate Java byte-codes, executing the Java byte-codes on a Java virtual machine, and other post process operations that will be apparent to those skilled in the art.

As mentioned above, the preprocessor of the embodiments of the present invention transforms each line of the Java template and writes the transformed lines to an intermediate program file. The line transformation allows embodiments of the present invention to provide improved flexibility and power, as discussed subsequently with reference to FIG. 5.

Figure 5:
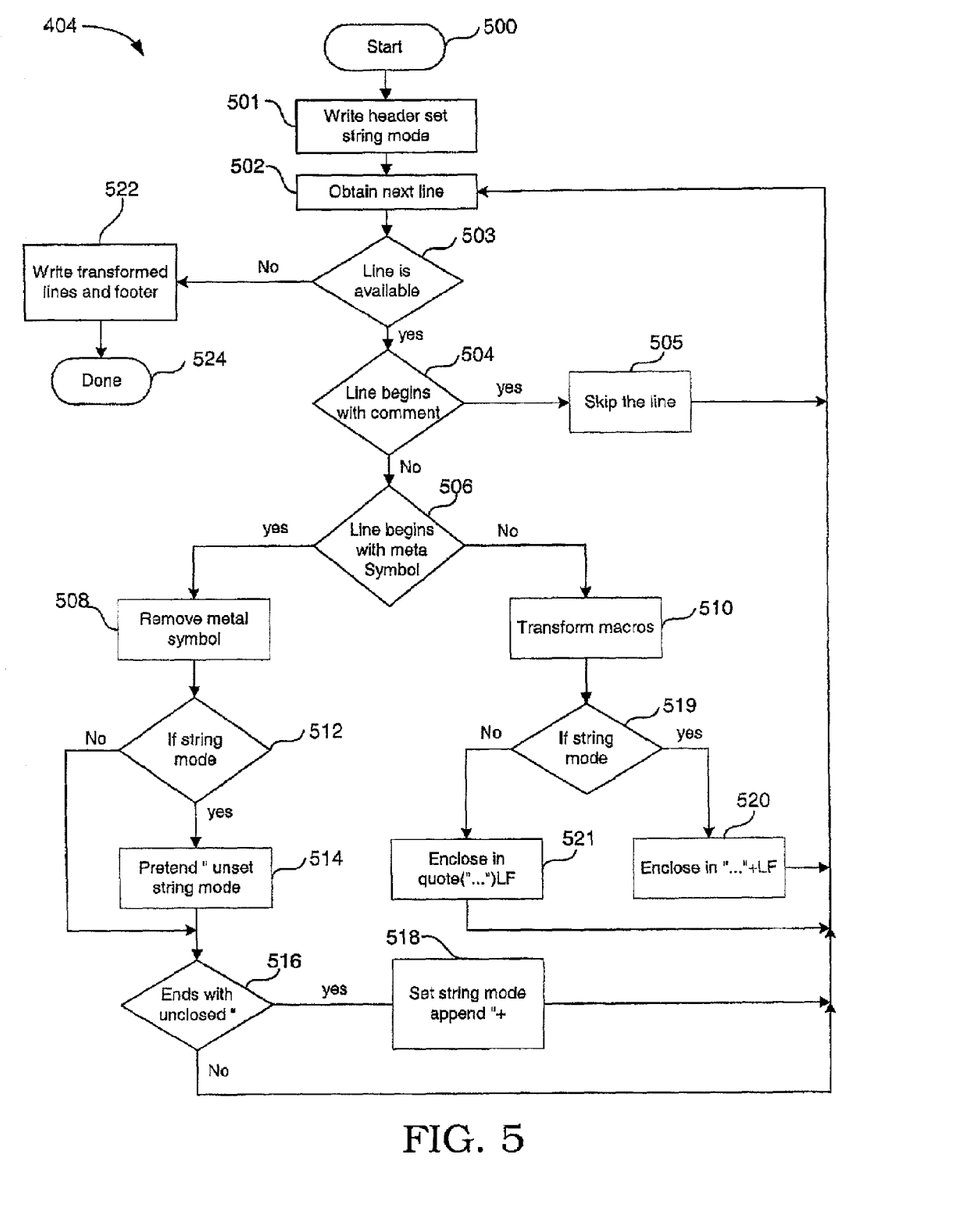
FIG. 5 is a flowchart showing a method for transforming the lines of a Java template file, in accordance with an embodiment of the present invention.

FIG. 5 is a flowchart showing a method 404 for transforming the lines of a Java template file, in accordance with an embodiment of the present invention. In an initial operation 500, pre-process operations are performed. Pre-process operations include reading the Java template, creating header and footer data, and other pre-process operations that will be apparent to those skilled in the art.

In operation 501, the header is written to the intermediate program file. In addition, string mode is set. In addition to processing normal object text, the Java preprocessor of the present invention is further capable of processing string mode text. String mode text is text that does not begin with a meta symbol and occupies multiple lines in a file. More particularly, the line of text includes LineFeed or end-of-line symbols. As described in greater detail subsequently, the preprocessor of the embodiments of the present invention is capable of operating on strings that occupy multiple lines as though the string comprised a single line of text.

In operation 502, the next line in the Java template is obtained. As previously mentioned, the Java template includes both Java programming language code and meta code. The meta code is lines of text in the Java template that start with a predetermined meta symbol, such as the '#' symbol, and are treated by the Java macro preprocessor as preprocessor directives.

A decision is then made as to whether additional lines remain in the Java template, in operation 503. If additional lines remain in the Java template, the method 404 continues with comment check operation 504. Otherwise, the method 404 proceeds to write operation 522.

A decision is made as to whether the obtained line begins with a comment symbol, in a comment check operation 504. The Java macro preprocessor treats lines beginning with a comment symbol, such as a '##' symbol, as preprocessor comments that are not compiled by the preprocessor or written to the intermediate program. Thus, if the obtained line begins with a comment symbol, the method 404 proceeds to operation 505. Otherwise, the method 404 continues with operation 506.

In operation 505, the line of text is skipped. As mentioned above, lines beginning with a comment symbol, such as a '##' symbol, are not compiled by the preprocessor or written to the intermediate program. As such, the preprocessor skips these lines and the next available line is obtained in operation 502.

A decision is then made as to whether the obtained line begins with a meta symbol, in operation 506. The Java macro preprocessor treats lines beginning with a meta symbol as preprocessor directives that will be compiled by the preprocessor. Thus, if the obtained line begins with a meta symbol, the method 404 proceeds to operation 508. However, if the line does not begin with a meta symbol, the line should not be compiled normally, thus the method 404 proceeds to operation 510 when an obtained line does not begin with a meta symbol.

In operation 508, the meta symbol is removed. Since the meta symbol indicates that the line is a preprocessor directive, the preprocessor will compile the line. Hence, the meta symbol is removed allowing the line to be compiled normally by the preprocessor. Another decision is then made as to whether string mode is set, in operation 512. As indicated above with reference to operation 501, the preprocessor initial sets the string mode when creating an intermediate program. Thereafter, the string mode can be set or unset, depending on the contents of the Java template. If string mode is set the method 404 continues proceeds to operation 514. Otherwise, the method continues with operation 516.

In operation 514, the line is prepended with a quotation mark and the string mode is unset. A decision is then made as to whether the line ends with unclosed quotes, in operation 516. If the line ends with unclosed quotes, the method 404 proceeds to operation 518. Otherwise, the method 404 continues with another obtain next line operation 502. In operation 518, the string mode is set and a "+ is appended to the end of the line. The method 404 then continues with another obtain next line operation 502.

As mentioned above, when the line does not begin with a meta symbol, the line should not be compiled normally, thus the method 404 proceeds to operation 510 when an obtained line does not begin with a meta symbol. In operation 510, macros within the obtained line are transformed into the appropriate instructions. A macro defines how to expand a single language expression into a text string that will be written to the final object text file. The macro can be any Java expression. Macros are useful especially when a sequence of instructions is used a number of times, and possibly by different programmers working on a project. As with meta code lines, a macro is preceded by a predefined symbol, such as a "@" symbol.

The macros within the obtained line are transformed into the appropriate instructions. For example, one embodiment of the present invention includes the following macro definitions: "@<javaIdentifier>", "@<javaMethodCall>", "@(<anyJavaExpression>)", and "@'<anyJavaSymbol>'". In this embodiment, the macros are transformed as follows:

```
"@<javaIdentifier>"       -> "screenString(<javaIdentifier>)"
"@<javaMethodCall>"       -> "screenString(<javaMethodCall>)"
"@(<anyJavaExpression>)"  -> "screenString(<anyJavaExpression>)"
"@'<anyJavaSymbol>'"      -> "<anyJavaSymbol>"
```

String context can be handled in a similar manner, however a string macro generally starts with the "\@" sequence, rather than the "@" sequence.

Another decision is then made as to whether string mode is set, in operation 519. As indicated above with reference to operation 501, the preprocessor initial sets the string mode when creating an intermediate program. Thereafter, the string mode can be set or unset, depending on the contents of the Java template. If string mode is set the method 404 continues proceeds to operation 520. Otherwise, the method continues with operation 521.

If the string mode is not set, the line is then enclosed in double quotes and a LineFeed is appended to the end of the line, in operation 520. By enclosing the line in double quotes, the embodiments of the present invention treat the line as a string constant during the preprocessor compiling operation. If the string mode is set, the line is prepended with an internal preprocessor method call and an open bracket, and quote, in operation 521. In addition, the line is appended with a closing quote, closing bracket and a LineFeed. For example, if a Java template included the following line:

some line the preprocessor would enclose the line in double quotes, prepend an internal method call and an open bracket, and append a closing bracket and semicolon to the line as follows:

L("some line");

The L method can be a method whose arguments will actually constitute the output intermediate program file. The function of the L method is essentially to call a println method of a PrintWriter wrapped around a 'new FileWriter (<output file>)' object.

In operation 522, the footer data and transformed lines are written to the intermediate program file. If there are errors in macro syntax (e.g. no closing bracket), the preprocessor terminates. Post process operations are then performed in operation 524. Post process operations include compiling the intermediate program file, generating the Java object text file, and other post process operations that will be apparent to those skilled in the art.

Figure 6:
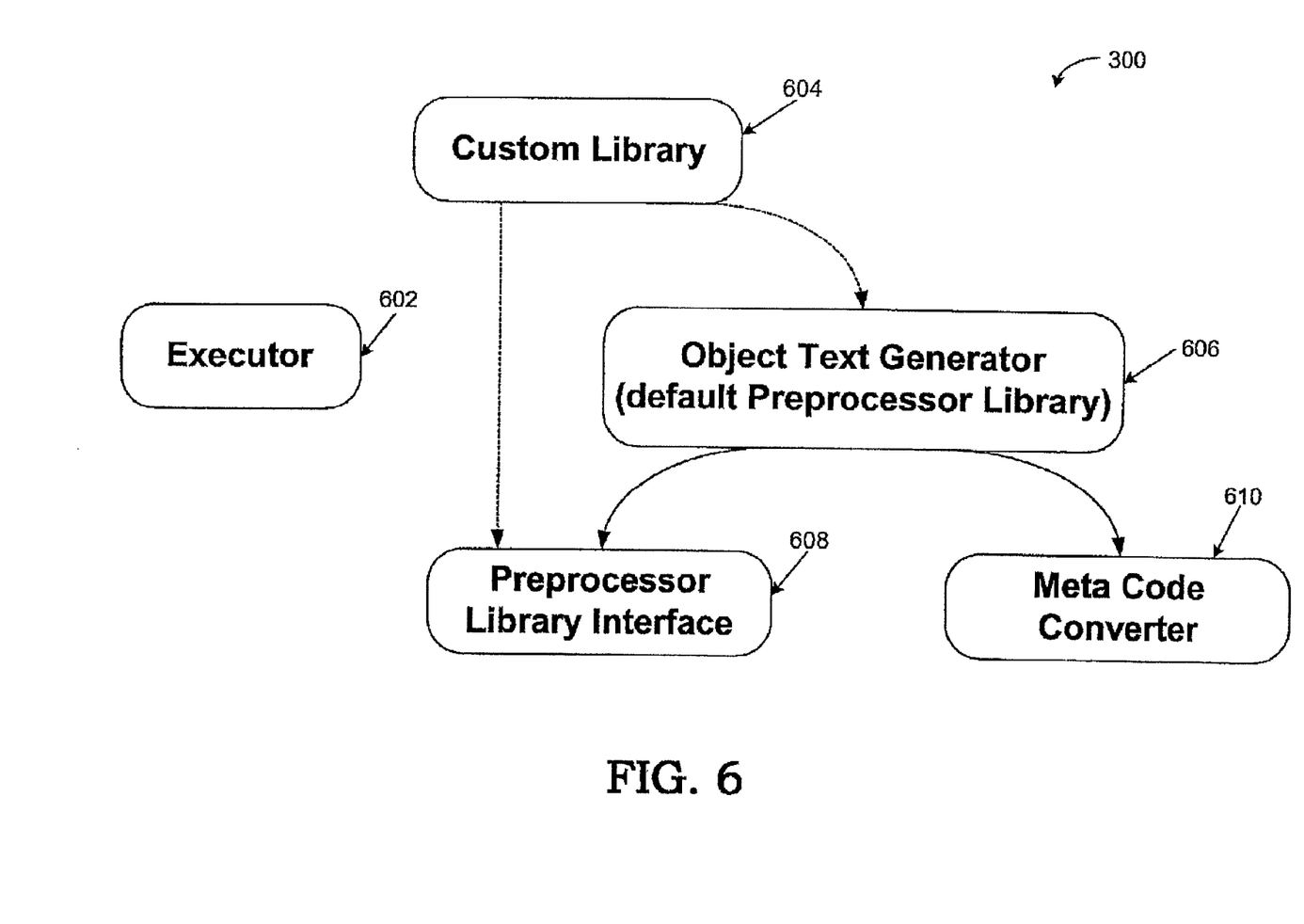
FIG. 6 is a block diagram showing a Java preprocessor, in accordance with an embodiment of the present invention.

FIG. 6 is a block diagram showing a Java preprocessor 300, in accordance with an embodiment of the present invention. The Java preprocessor 300 includes an executor module 602, a custom library 604, an object text generator module 606, a preprocessor library interface module 608, and a meta code converter module 610.

The Java preprocessor 300 includes two core modules that implement the preprocessor itself, namely, the meta code converter module 610 and the object text generator module 606. The meta code converter module 610 includes a main class, JmppReader, and auxiliary classes, which can be defined in the same source file. The meta code coverter module 610 transforms a single line of a template code into a line of the intermediate program code. Note that the intermediate program includes not only lines resulted from the 'template line'->'intermediate program line' conversion. The intermediate program also includes lines generated by the object text generator module 606.

The object text generator module 606 includes a main class, JmppLib, and auxiliary classes, which can be defined in the same source file. The object text generator module 606 is the main module of the preprocessor 300, and is responsible for the intermediate program's prolog and epilog code generation, and compiling of the intermediate program (using a Java compiler). The object text generator module 606 is also responsible for running the intermediate program, which actually generates the object text file. The main class of the object text generator module 606 also serves as a super class for any preprocessor libraries, which are extensions that use the preprocessor engine for more specific purposes, such as for generating a number of tests from a single template.

The Java preprocessor 300 further includes two additional modules that extend the preprocessor's functionality, namely, the preprocessor library interface module 608 and the executor module 602. The preprocessor library interface module 608 typically includes a single interface. The preprocessor library interface module 608 specifies a contract that should be implemented by any Java preprocessor library, such as the custom library 604, that is to be supported in some interactive test development system, such as SUN MICROSYSTEMS' TDK product. There are two levels of support that a preprocessor library can request from an interactive test development system, basic and full. The basic support level generally only supports test generation. The full support level supports the basic level plus a template creation wizard.

The executor module 602 typically includes a single class that allows the executor module 602 to preprocess templates using an object text generator different from the default one described above. The executor module 602 calculates the object text generator class name based on the first template line and the command line options, loads the object text generator class, and invokes main method of the object text generator class.

Figure 7:
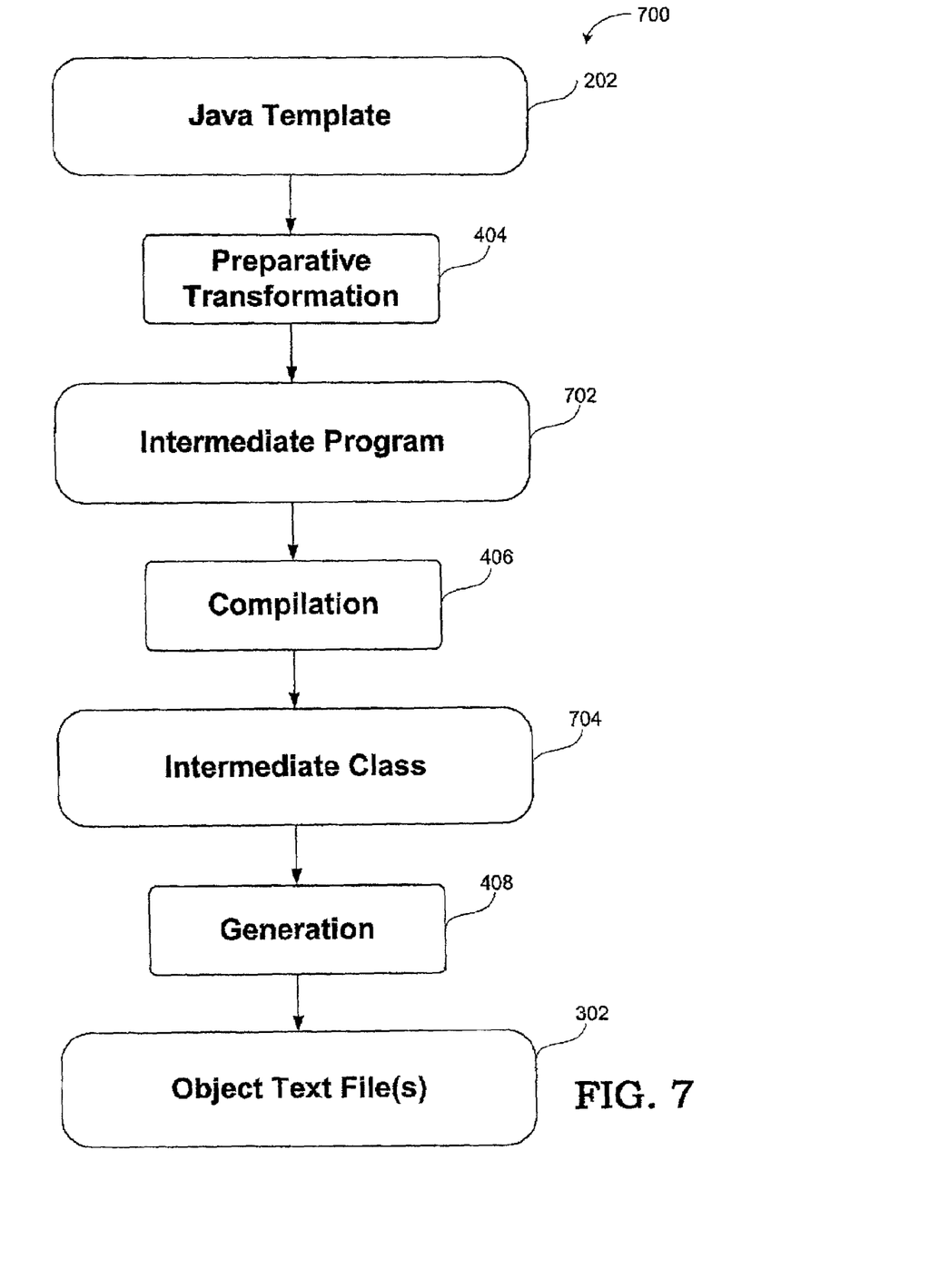
FIG. 7 is a diagram showing a Java preprocessing method, in accordance with an embodiment of the present invention.

FIG. 7 is a diagram showing a Java preprocessing method 700, in accordance with an embodiment of the present invention. As shown in the method 700, a Java template 202 is provided. The Java template 202 is a plain text file possibly containing Java preprocessor directives, referred to as meta code, and is used as an input file for Java preprocessor, typically passed as command line argument.

In the preparative transformation stage 404, the Java template is used to create an intermediate program file. The preprocessor reads the Java template, creates a header and a footer code, transforms each of Java template lines, and writes the header, the transformed lines in the original order, and the footer to an intermediate program file. As mentioned previously, the header can include some copyright information, Java language 'package' and 'import' clauses, and intermediate program class' declaration with an opening brace '{'. The footer can include the definition of the 'main' method and a closing brace '}'. The intermediate program 702 is a Java source file including the definition of an intermediate class, which produces the object text file when executed by a Java virtual machine. The intermediate program file 702 is produced as the result of the first Java preprocessing stage, namely the preparative transformation stage 404.

The intermediate program 702 is then compiled in the compilation stage 406 to create intermediate classes. The preprocessor creates an instance of the main javac compiler class, constructs necessary arguments and invokes its 'main' method to compile the intermediate program. If compilation succeeds, the preprocessor remembers the intermediate program class name, otherwise the preprocessor terminates. The intermediate class 704 is a class file that results from compilation of the intermediate program source by javac. The intermediate class file 704 is produced as the result of the second Java preprocessing stage, namely, the compilation stage 406.

A Java object text file is then generated based on the intermediate class, during the generation stage 408. The preprocessor loads the intermediate program class and invokes its 'main' method, which actually starts generation of the object text file. The object text file 302 is the target file of the Java preprocessing process. The object text file 302 is produced as the result of the final preprocessing stage, namely, the generation stage 408. It should be noted that there can be more than one object text file 302 generated from a Java template 202 in cases where a custom Java library is used as the generator.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for use in a computing system for preprocessing JAVA application code, comprising the operations of:
   receiving a JAVA template file, the JAVA template file including JAVA programming language code and meta code, the meta code being a computer program written in meta language using a programming language;
   processing the JAVA template to create an intermediate program using the meta code, wherein the intermediate program is a JAVA program;
   compiling the intermediate program to create an intermediate, class, wherein the intermediate class is a JAVA based class; and
   generating an object text file using the intermediate class.

2. A method as recited in claim 3, wherein the meta code can include JAVA programming language statements.

3. A method as recited in claim 1, wherein the meta code is equivalent to the JAVA programming language.

4. A method as recited in claim 1, further comprising the operation of transforming lines in the JAVA template.

5. A method as recited in claim 4, wherein the transformed lines are entered into the intermediate program.

6. A method as recited in claim 5, further comprising the operation of entering header data into the intermediate program.

7. A method as recited in claim 5, further comprising the operation of entering footer data into the intermediate program.

8. A method for use in a computer system for transforming lines of a Java template for preprocessing, comprising the operations of:
   obtaining a line of text from a Java template;
   determining if the line of text begins with a meta symbol, wherein the meta symbol is a predefined symbol indicating the line of text is a preprocessor directive;
   removing the meta symbol from the line of text when the line of text begins with the meta symbol; and
   transforming the line of text into a function argument when the line of text does not begin with the meta symbol.

9. A method as recited in claim 8, wherein transforming the line of text into a function argument comprises the operation of enclosing the line of text in quotes.

10. A method as recited in claim 9, wherein transforming the line of text into a function argument further comprises the operation of prepending the line of text with an internal preprocessor method call and an open bracket.

11. A method as recited in claim 10, wherein transforming the line of text into a function argument further comprises the operation of appending a closing bracket and a semicolon to the end of the line of text.

12. A method as recited in claim 11, wherein the quotes are double quotes.

13. A method as recited in claim 8, further comprising the operation of determining whether macros are present in the line of text.

14. A method as recited in claim 13, further comprising the operation of transforming macros present in the line of text into appropriate instructions.

15. A method as recited in claim 8, further comprising the operation of writing header data, footer data, and the transformed lines of text to an intermediate program.

16. A Java preprocessor for use in a computing system, comprising:
   a meta code converter capable of processing a Java template to create an intermediate program using meta code included in the Java template; and
   an object text generator that compiles the intermediate program to create an intermediate class, wherein the intermediate class is a Java based class, the object text generator also capable of generating an object text filed using the intermediate class.

17. A Java preprocessor as recited in claim 16, wherein the meta code is a computer program written in meta language.

18. A Java preprocessor as recited in claim 17, wherein the meta language uses the Java programming language.

19. A Java preprocess as recited in claim 18, further comprising a preprocessor library interface module that specifies a contract that can be extended by any Java preprocessor library that is to be supported by the Java preprocessor.

20. A Java preprocessor as recited in claim 19, further comprising an executor module that calculates the name of the object text generator class and invokes main method of the object text generator class.

* * * * *